(12) United States Patent
Tapang

(10) Patent No.: US 8,102,390 B2
(45) Date of Patent: Jan. 24, 2012

(54) FRAME BY FRAME, PIXEL BY PIXEL MATCHING OF MODEL-GENERATED GRAPHICS IMAGES TO CAMERA FRAMES FOR COMPUTER VISION

(76) Inventor: Carlos Tapang, Renton, WA (US)

( * ) Notice: Subject to any disclaimer, the term of this patent is extended or adjusted under 35 U.S.C. 154(b) by 946 days.

(21) Appl. No.: 11/993,169

(22) PCT Filed: Sep. 12, 2006

(86) PCT No.: PCT/IB2006/053244
§ 371 (c)(1),
(2), (4) Date: Dec. 19, 2007

(87) PCT Pub. No.: WO2007/031947
PCT Pub. Date: Mar. 22, 2007

(65) Prior Publication Data
US 2010/0283778 A1 Nov. 11, 2010

Related U.S. Application Data

(60) Provisional application No. 60/716,139, filed on Sep. 12, 2005.

(51) Int. Cl.
*G06T 15/00* (2011.01)
*G06T 15/20* (2011.01)
(52) U.S. Cl. .................................. 345/419; 345/427
(58) Field of Classification Search .................. None
See application file for complete search history.

(56) References Cited

U.S. PATENT DOCUMENTS

| | | | |
|---|---|---|---|
| 4,799,267 A | 1/1989 | Kamejima | |
| 5,259,040 A | 11/1993 | Hanna | |
| 5,801,970 A | 9/1998 | Rowland | |
| 6,047,078 A | 4/2000 | Kang | |
| 6,249,616 B1 * | 6/2001 | Hashimoto | 382/284 |
| 6,307,959 B1 | 10/2001 | Mandelbaum | |
| 6,704,621 B1 | 3/2004 | Stein | |
| 6,738,099 B2 | 5/2004 | Osberger | |
| 7,508,977 B2 * | 3/2009 | Lyons et al. | 382/154 |
| 2002/0082080 A1 * | 6/2002 | Kojima | 463/31 |
| 2003/0016846 A1 * | 1/2003 | Chen et al. | 382/117 |
| 2004/0052418 A1 * | 3/2004 | DeLean | 382/209 |
| 2004/0151362 A1 * | 8/2004 | Hamaguchi et al. | 382/145 |
| 2005/0190972 A1 * | 9/2005 | Thomas et al. | 382/218 |
| 2006/0028549 A1 * | 2/2006 | Grindstaff et al. | 348/144 |
| 2011/0002532 A1 * | 1/2011 | Frakes et al. | 382/154 |
| 2011/0074974 A1 * | 3/2011 | Hildreth | 348/222.1 |

OTHER PUBLICATIONS

Desouza, G.N.; Kak, A.C.; , "Vision for mobile robot navigation: a survey," Pattern Analysis and Machine Intelligence, IEEE Transactions on , vol. 24, No. 2, pp. 237-267, Feb. 2002.*

Georgiev, A.; Allen, P.K.; , "Localization methods for a mobile robot in urban environments," Robotics, IEEE Transactions on, vol. 20, No. 5, pp. 851- 864, Oct. 2004.*

Stein, Mano, and Shashua, "A Robust Method for Computing Vehicle Ego-Motion" IEEE Intelligent Vehicles Symposium (IV2000), Oct. 2000, Dearborn, MI.

(Continued)

*Primary Examiner* — Daniel Hajnik

(57) ABSTRACT

The invention employs state-of-the-art computer graphics to advance the field of computer vision. The invention uses model-generated graphics in image processing: match image frames rendered by a graphics engine to those from a camera, in real-time, frame by frame, pixel by pixel. An a priori model of the world is required, but the benefit is very accurate position and pose of the camera for every frame.

17 Claims, 3 Drawing Sheets

OTHER PUBLICATIONS

Thomas, "Television Motion Measurement for DATV and Other Applications", BBC Research Department Report, Nov. 1987, Research Department, Engineering Division, The British Broadcasting Corporation.

Hager, Hutchinson, and Corke, "Tutorial TT3: A Tutorial on Visual Servo Control", 1996, http://citeseer.ist.psu.edu/39300.html.

Malis and Benhimane, "A Unified Approach to Visual Tracking and Servoing", Robotics and Autonomous Systems, vol. 52, Issue 1, pp. 39-52, Jul. 31, 2005.

Benhimane and Malis, "Real-time Image-based Tracking of Planes Using Efficient Second-order Minimization", IEEE/RSJ International Conference on Intelligent Robots Systems, Sendai, Japan, Oct. 2004.

* cited by examiner

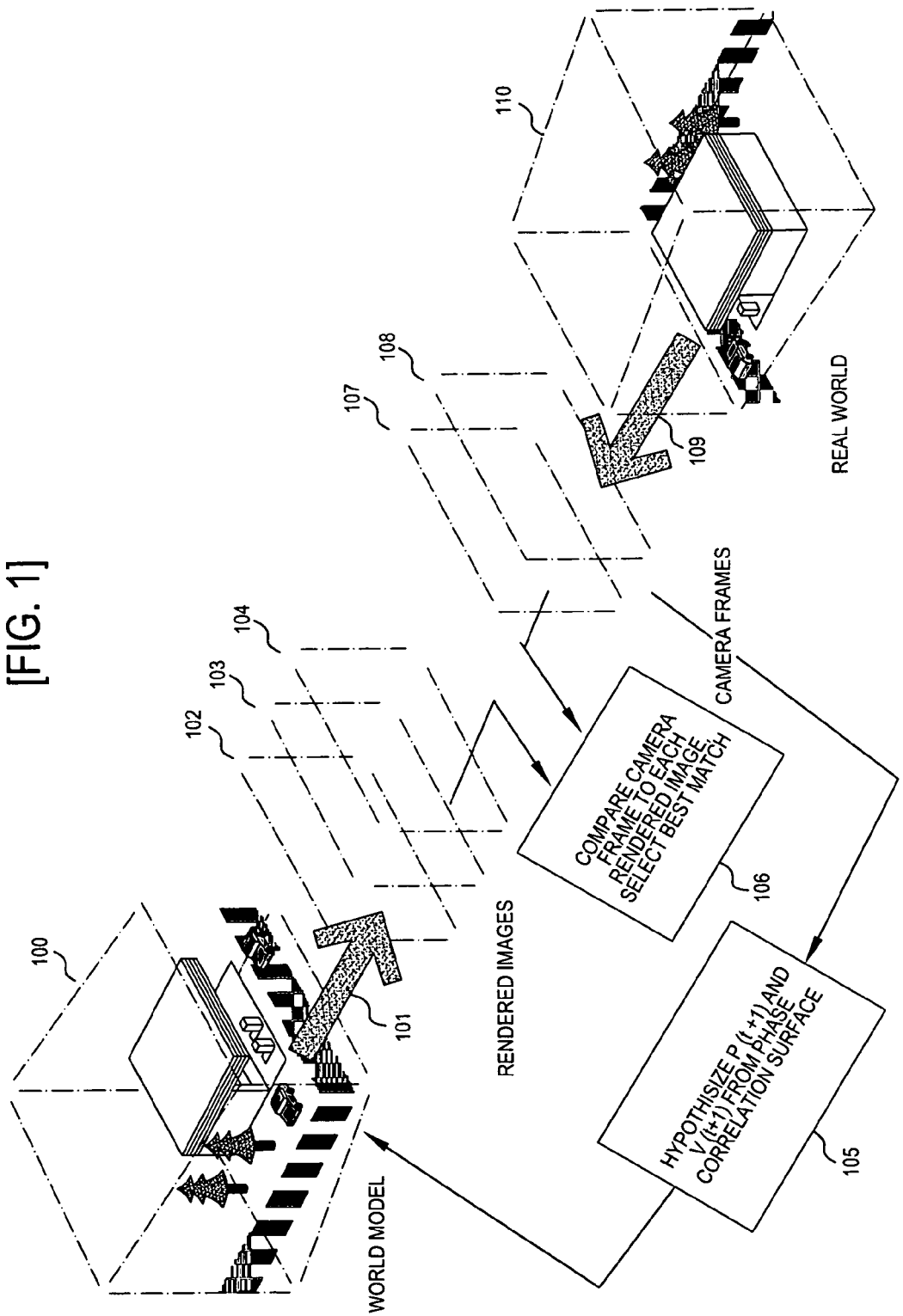
[FIG. 1]

[Fig. 2]

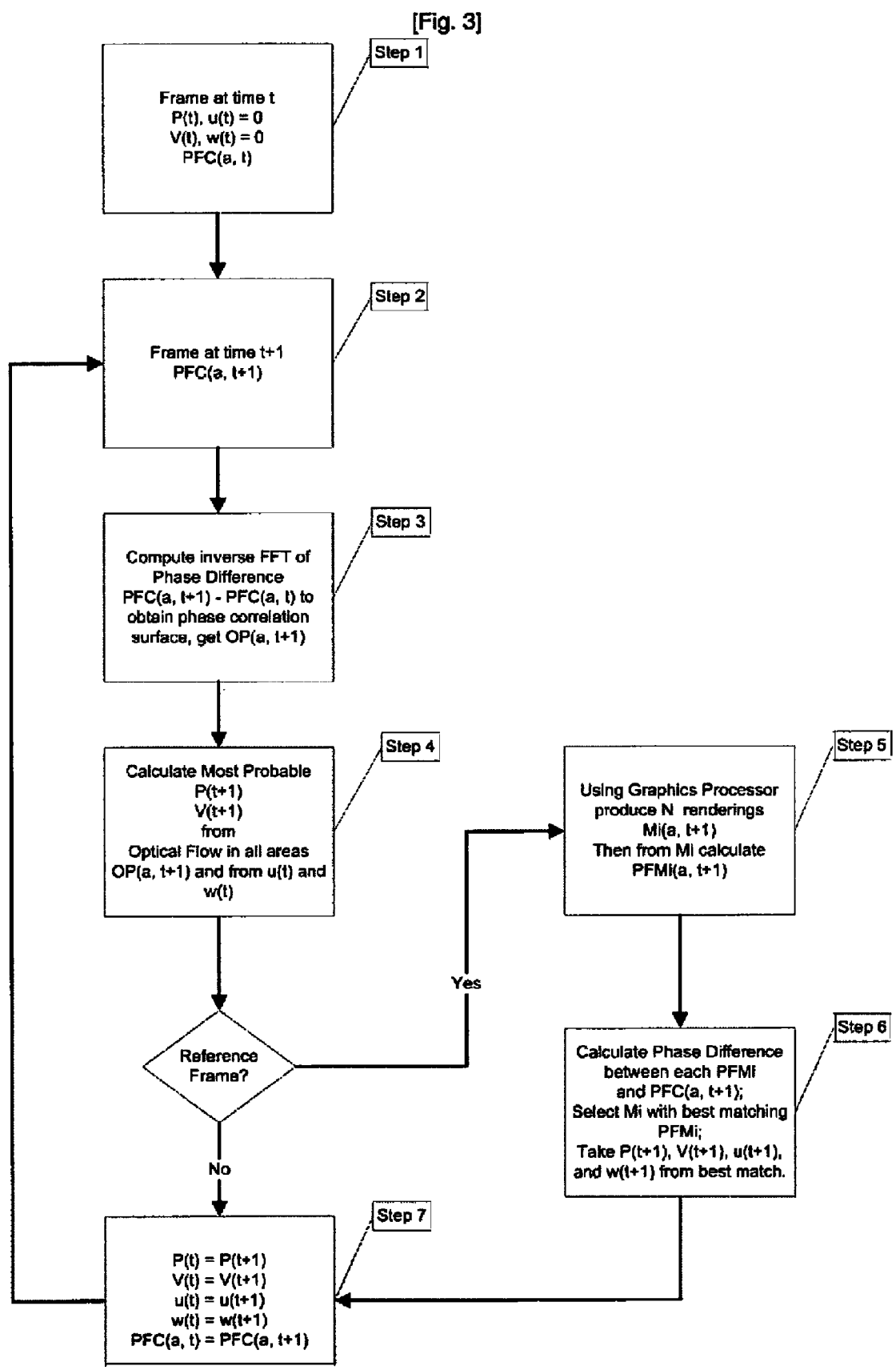

FRAME BY FRAME, PIXEL BY PIXEL MATCHING OF MODEL-GENERATED GRAPHICS IMAGES TO CAMERA FRAMES FOR COMPUTER VISION

This invention uses state-of-the-art computer graphics to advance the field of computer vision.

Graphics engines, particularly those used in real-time, first person shooter games, have become very realistic. The fundamental idea in this invention is to use graphics engines in image processing: match image frames generated by a real-time graphics engine to those from a camera.

BACKGROUND OF THE INVENTION

There are two distinct tasks in vision or image processing. On the one hand there is the difficult task of image analysis and feature recognition, and on the other there is the less difficult task of computing the 3D world position of the camera given an input image.

In biological vision, these two tasks are intertwined together such that it is difficult to distinguish one from the other. We perceive our position in world coordinates by recognizing and triangulating from features around us. It seems we can not triangulate if we don't identify first the features we triangulate from, and we can't really identify unless we can place a feature somewhere in the 3D world we live in.

Most, if not all, vision systems in prior art are an attempt to implement both tasks in the same system. For instance, reference patent number U.S. Pat. No. 5,801,970 comprises both tasks; reference patent number U.S. Pat. No. 6,704,621 seems to comprise of triangulation alone, but it actually requires recognition of the road.

SUMMARY OF THE INVENTION

If the triangulation task can indeed be made separate from and independent of the analysis and feature recognition tasks, then we would need half as much computing resources in a system, such as a computer, that does not perform the latter task. By taking advantage of current advances in graphics computer processing, this invention allows for triangulation of the camera position without the usual scene analysis and feature recognition. It utilizes an a priori, accurate model of the world within the field of vision. The 3D model is rendered onto a graphics surface using the latest graphics processing units. Each frame coming from the camera is then searched for a best match in a number of candidate renderings on the graphics surface. The count of rendered images to compare to is made small by computing the change in camera position and angle of view from one frame to another, and then using the results of such computations to limit the next possible positions and angles of view to render the a priori world model.

The main advantage of this invention over prior art is the mapping of the real world onto a world model. One application for which this is most suited is robotic programming. A robot that is guided by an a priori map and that knows its position in that map is far more superior to one that is not so guided. It is superior with regards to navigation, homing, path finding, obstacle avoidance, aiming for point of attention, and other robotic tasks.

BRIEF DESCRIPTION OF THE DRAWINGS

FIG. 1 is a diagram of an embodiment of the invention showing how camera motion in the real world is tracked in a 3D model of the world.

FIG. 2 is an illustration of either the rendering surface or the camera frame divided into areas.

FIG. 3 is a high level Flowchart of the algorithm described below.

DETAILED DESCRIPTION OF THE INVENTION

In FIG. 1 a diagram of a preferred embodiment of the invention is shown. An a priori model of the world 100 is rendered using currently available advanced graphics computer processor 101 onto rendered images 102, 103, and 104. This invention can be implemented in software (as in a computer program product), or partially in software and hardware, or hardware only. The model is an accurate but not necessarily complete model of the real world 110. The purpose of the invention is to track the position and view angle of the camera 309 that produces frames 107 and 108 at time t and t+1, respectively. Frames 107 and 108 serve as the primary real-time input to the apparatus. Optical flow vectors are calculated from frames 107 and 108 using state-of-the-art methods. From those optical flow vectors, an accurate heading and camera view angle can be derived in a way that is robust against noise and outliers, according to prior art. Next probable positions are then hypothesized around a point that lies on the line defined by the current heading, at a distance from the current position determined from current speed (105). The probable candidate positions N are rendered into N candidate images 102, 103, and 104 by the graphics processor or processors 101. Each rendered image is then compared to the current camera frame and the best matching image selected (106). From the selected image, the most accurate position, instantaneous velocity, view angle, and angular velocity of the camera can also be selected from the candidate positions.

Dynamic, frame-by-frame triangulation (or tracking) is accomplished in this invention using the following steps, the Flowchart for which is shown in FIG. 3. In the following descriptions of steps, for every video frame coming from the camera, there is a hypothesized set of possible frames rendered by the graphics processor to compare to. In this invention, such comparisons are the most expensive computationally. The video frame is equal in both vertical and horizontal resolution to the rendered image. Each frame and each rendered image is divided into a number of rectangular areas which may overlap one another by a number of pixels, as shown in FIG. 2.

1. Start with a frame from the camera and a known, absolute world position P(t), view angle V(t), zero velocity u(t)=0, and zero angular velocity w(t)=0 of the camera at the instant of time 't' when that frame is taken. Calculate the discrete Fast Fourier Transform (FFT) of all areas (Cs) in this frame, and extract the phase components of the transform, PFC(a, t) in area 'a' at time 't'.

2. Take the next frame. Calculate all PFC(a, t+1), the phase component of FFT in area 'a' at time 't+1'.

3. Compute the phase differences between PFC(a, t) and PFC(a, t+1), and then perform an inverse FFT transform on the phase difference matrix in order to obtain the phase correlation surface. If the camera neither panned nor moved from 't' to 't+1', then the phase correlation surface for each area would indicate a maximum at the center of that area 'a'. If it moved or panned, then the maximum would occur somewhere other than the center of each area. Calculate the optical flow vector for each area OP(a, t+1), which is defined as the offset from the center to the maximum point in the phase correlation surface. (If there are moving objects in an area of the scenery, each moving object would cause an extra peak in the phase correlation surface, but as long as the two areas from subsequent frames being compared are dominated by static objects like buildings or walls or the ground, then those other peaks should be lower than the peak that corresponds to camera position and/or view angle change.)

4. From all such OP(a, t+1) and using absolute position P(t), view angle V(t), current velocity u(t), and current angular velocity w(t), calculate a range of all possible absolute camera positions (vectors Pi(t+1)) and view angles (unit vectors Vi(t+1)) at time t+1. Pi may be chosen to lie within the line of motion (instantaneous heading), which is easily determined from OP(a, t+1) as detailed in Chapter 17 of the reference book titled "Robot Vision" by B. K. P. Horn published in 1986 by The MIT Press.

5. Hypothesize a small number (say N) of possible camera positions Pi(t+1) and view angles Vi(t+1) to render using the a priori model. This results in N image renderings Mi(a, t+1). Calculate the FFT of each Mi(a, t+1) and extract the phase components of the transform, PFMi(a, t+1).

6. The best match to the camera frame at t+1 is that Mi each of whose area PFMi(a, t+1) phase differences with PFC(a, t+1) results in an inverse FFT transform which is a 2D graph with maximum nearest the center, all areas considered. From this the best possible position P(t+1) and view angle V(t+1) are also selected. The instantaneous velocity is then determined as u(t+1)=P(t+1)−P(t), together with the instantaneous angular velocity w(t)=V(t+1)−V(t).

7. Throw away the previous time t calculations and frames and make t+1 the current time by copying over P(t+1) to P(t), V(t+1) to V(t), u(t+1) to u(t), w(t+1) to w(t), and PFC(a, t+1) to PFC(a, t). Jump back to Step 2.

As long as the field of view of the camera is dominated by static entities (static with respect to world coordinates, with less area of the image taken up by moving entities), then dynamic triangulation or tracking is possible. The peak in the phase correlation surface corresponds to camera motion as long as the camera frames and thereby the areas are dominated by static entities. This is well-known in prior art, as detailed in reference article titled "Television Motion Measurement for DATV and other Applications" by G. A. Thomas published in 1987 by the British Broadcasting Corporation (BBC).

ALTERNATIVE EMBODIMENTS

In an alternate embodiment of the invention, the computational cost of Steps 5 and 6 are amortized over K frames, and the resulting correction propagated to a future frame. For example, if a reference frame is chosen for every 5 camera frames (K=5), then the first frame is a reference frame, and Steps 5 and 6 can be done within the time interval from the first frame sample to the fifth (t+1 to t+5). Meanwhile, all other steps (Steps 1 through 4 and 7) are performed on all samples, using uncorrected values for P and V for all sample frames. On the fifth frame, when the best match for the first frame is finally selected, the error corrections are applied. The same error corrections can be applied to all five values of P and V, and because by t+5 all previous values of P and V have been discarded, only P(t+5) and V(t+5) need be corrected.

In another embodiment of the invention, the computational cost of Steps 5 and 6 is dealt with by using a plurality of low-cost gaming graphics processors, one for each hypothesized camera location.

In still another embodiment, instead of computing for the phase correlation surface between the camera frame and a rendered image, in Steps 5 and 6, the sum of squares of the differences in luminance values can be computed instead (called "direct method" in prior art). The best match is the rendered image with the least sum of squares.

What have been described above are preferred embodiments of the invention. However, it is possible to embody the invention in specific forms other than those of the preferred embodiments described above. For instance, instead of square or rectangular areas 'a', circular areas may be used instead.

An exemplary application of the invention is tracking the position and view angle of the camera. However, one skilled in the art will understand and recognize that an apparatus or method of operation in accordance with the invention can be applied in any scenario wherein determination of object position, navigation, or homing are of necessity. The preferred embodiments are merely illustrative and should not be considered restrictive in any way. The scope of the invention is given by the appended claims, rather than by the above description, and all variations and equivalents which fall within the spirit of the claims are intended to be included therein.

The invention claimed is:

1. A method for tracking the location and view angle of a calibrated camera in real-time comprising the steps of:
   (a) Creating an a priori model of the world in which the camera exists;
   (b) Taking each raw, unprocessed video frame from the camera wherein each video frame is subdivided into rectangular or square areas that overlap by zero or up to 100 per cent of the pixels in each video frame; (c) For each video frame, hypothesizing a small set of possible locations and view angles at which such frame is taken, the count of hypothesized set of locations and view angles being limited by computing the most probable motion vector and view angle of the camera from two frames, one preceding another, such computation comprising the steps of:
   (i) computing a fast fourier transform of each area in a current camera frame, each area being processed independently of another to form a fast fourier transform matrix and;
   (ii) taking the phase components of the resulting fast fourier transform matrix and coming up with a pure phase component matrix;
   (iii) storing said pure phase component matrix in a memory;
   (iv) utilizing said pure phase component matrices from the current frame and a previous frame, taking the phase differences between each area of the current camera frame and the corresponding area of the previous camera frame to form a phrase difference matrix;
   (v) computing a inverse fast fourier transform of the phase difference matrix, resulting in a phase correlation surface;
   (vi) determining a 2D position of the maximum in said phase correlation surface in each area, said 2D position forming a 2D optical flow vector for each area; and
   (vii) calculating the most probable 3D motion vectors and view angles of the camera from optical flow vectors of all areas comprising the steps of:
      (1) determining the heading or direction of movement in the world frame of reference, to define a line along which the most probable next positions lie;
      (2) using the previous calculation of speed to determine a candidate next position along the line of heading;

(3) picking a number of most probable positions from a cubical selection of points around the calculated candidate; and (4) using gradient descent to select the best next position within the cubical selection of points;

(d) For each video frame, rendering images using a graphics processor and vertex data from the a priori model, one rendered image for each hypothesized location and view angle and wherein each of the video frames and rendered images are of equal resolution; and the rendered images are subdivided into rectangular or square areas that overlap by zero or up to 100 per cent of the pixels; and (e) For each video frame, picking the best location and view angle by finding the best matching rendered image to the video frame.

2. The method as claimed in claim 1, wherein the graphics processor is a low-cost graphics processor used to render the a priori model of the world.

3. The method as claimed in claim 2, wherein the first video frame is from a known position and view angle.

4. The method as claimed in claim 1, wherein the method of selecting the best matching rendered image to every video frame comprises the following sub-steps: Computing a fast fourier transform (FFT) of each area in rendered image; Taking the phase components of each area's FFT matrix; Utilizing the phase component matrices from the current frame and those from the rendered image, taking the phase differences between each area of the current camera frame and the corresponding area of the rendered image; such differences forming a phase correlation matrix; Computing the inverse FFT transform of the phase correlation matrix between the camera frame area and the rendered image area, resulting in the phase correlation surface for each area; and the best matching rendered image is that which has the lowest sum of squared (dot product) optical flow vectors, summed over all areas.

5. The method as claimed in claim 1, wherein the method of selecting the best matching rendered image to every video frame comprises the following sub-steps: For every rendered image, get differences in gray level for every pixel between the rendered image and the video frame; Calculate a simple sum of squares of all such differences for every area; and wherein the rendered image selected should be that with the least sum of squared differences with the video frame.

6. The method as claimed in claim 1, wherein the a priori model is constructed using currently available tools.

7. The method as claimed in claim 1, wherein the a priori model is constructed by image processing of video frames taken beforehand from the world in which the camera exists.

8. The method as claimed in claim 1, wherein the a priori model is constructed in real-time concurrently with, but separate from, a motion estimation of the camera.

9. An apparatus for tracking the location and view angle of a camera in real-time comprising:

(a) A video camera and its frame buffer whose contents are updated at a constant frame rate wherein each video frame from the camera is subdivided into rectangular or square areas that overlap by zero or up to 100 per cent of the pixels in each video frame;

(b) Digital processing means for computing an optic flow from one video frame to another, and from such optic flow analysis hypothesizing a number of trial camera locations and view angles, the count of hypothesized set of locations and view angles being limited by computing a most probable motion vector and view angle of the camera from two frames, one preceding another, such computation comprising the steps of:

(i) computing a fast fourier transform of each area in a current camera frame, each area being processed independently of another to form a fast fourier transform matrix;

(ii) taking the phase components of the resulting fast fourier transform matrix and coming up with a pure phase component matrix; (iii) storing this pure phase component matrix in memory;

(iv) utilizing the pure phase component matrices from the current camera frame and a previous camera frame, taking the phase differences between each area of the current camera frame and the corresponding area of the previous camera frame, such differences forming a phase correlation matrix;

(v) computing an inverse fast fourier transform of the phase correlation matrix, resulting in a phase correlation surface;

(vi) determining the 2d position of the maximum in the phase correlation surface in each area; such 2d position forms an optical flow vector for each area; and (vii) calculating the most probable 3d motion vectors and view angles of the camera from optical flow vectors of all areas comprising the steps of:

(1) determining the heading or direction of movement in the world frame of reference, to define a line along which the most probable next positions lie;

(2) using the previous calculation of speed to determine a candidate next position along the line of heading;

(3) picking a number of most probable positions from a cubical selection of points around the calculated candidate; and (4) using gradient descent to select the best next position within the cubical selection of points;

(c) An a priori model of the world;

(d) A graphics processor or a plurality of graphics processors capable of multiple renderings of the world model at a fraction of the time it takes the camera to update the frame buffer;

(e) A plurality of graphics surfaces or image buffers to store the rendered surfaces, each rendered surface corresponding to one of said trial location and one of said trial view angle in the world model;

wherein the video frames and rendered images are of equal resolution; and the rendered images are subdivided into rectangular or square areas that overlap by zero or up to 100 per cent of the pixels;

(f) Digital processing means for comparing each rendered image with the video frame buffer and then selecting the best matching rendered image, thereby also determining the most accurate instantaneous location and view angle of the camera.

10. The apparatus as claimed in claim 9, wherein the graphics processor is a low-cost graphics processor used to render the a priori model of the world.

11. The apparatus as claimed in claim 10, wherein the apparatus is initialized such that computations start from a known position, view angle, velocity, and angular velocity.

12. The apparatus as claimed in claim 9, configured to select the best matching rendered image to every video frame by using the following computations:

computing a fast fourier transform of each area in rendered image;

taking the phase components of each area's fast fourier transform matrix;

utilizing the phase component matrices from the current frame and those from the rendered image, taking the phase differences between each area of the current camera frame and the corresponding area of the rendered image; such differences forming a phase correlation matrix;

computing an inverse fast fourier transform of the phase correlation matrix between the camera frame area and the rendered image area, resulting in the phase correlation surface for each area, wherein the best matching rendered image is that which has the lowest sum of squared (dot product) optical flow vectors, summed over all areas.

13. The apparatus as claimed in claim 9, configured to select the best matching rendered image to every video frame by way of the following computations: For every rendered image, get differences in gray level for every pixel between the rendered image and the video frame; Calculate a simple sum of squares of all such differences for every area; and The rendered image selected should be that with the least sum of squared differences with the video frame.

14. The apparatus as claimed in claim 9, wherein the a priori model is constructed using currently available tools.

15. The apparatus as claimed in claim 9, wherein the a priori model is constructed by image processing of video frames taken beforehand from the world in which the camera exists.

16. The apparatus as claimed in claim 9, wherein the a priori model is constructed in real-time concurrently with, but separate from, a motion estimation of said camera.

17. A computer program product comprising a non-transitory computer-readable medium which, when loaded onto and executed by a computer, causes the computer to perform the method according to claim 1.

* * * * *